United States Patent [19]
Mazhar

[11] Patent Number: 5,447,342
[45] Date of Patent: Sep. 5, 1995

[54] HOSE COUPLING WITH SPRING CLIP HAVING INWARDLY AND OUTWARDLY CURVED SEGMENTS

[75] Inventor: Mohammad S. Mazhar, Sterling Heights, Mich.

[73] Assignee: The United States of America as represented by the Secretary of the Army, Washington, D.C.

[21] Appl. No.: 353,855

[22] Filed: Dec. 12, 1994

[51] Int. Cl.$^6$ .............................................. F16L 37/10
[52] U.S. Cl. ................................... 285/314; 285/321; 285/307
[58] Field of Search ............... 285/305, 307, 314, 321, 285/368, 310, 313

[56] References Cited

U.S. PATENT DOCUMENTS

| | | | |
|---|---|---|---|
| 2,267,252 | 12/1941 | Pitsch | 285/314 |
| 2,828,978 | 4/1958 | Wurzburger | 285/314 |
| 3,120,968 | 2/1964 | Calvin | 283/314 |
| 3,922,011 | 11/1975 | Walters | 285/321 |
| 4,226,445 | 10/1980 | Kramer | 285/321 |
| 4,408,383 | 10/1983 | Nottingham et al. | 285/305 |
| 4,412,694 | 11/1983 | Rosenberg | 285/314 |
| 4,632,436 | 12/1986 | Kimura | 285/321 |
| 4,635,974 | 1/1987 | Moussaian | 285/321 |
| 4,884,829 | 12/1989 | Funk et al. | 285/321 |
| 4,991,880 | 2/1991 | Bernart | 285/305 |

FOREIGN PATENT DOCUMENTS

| | | | |
|---|---|---|---|
| 683367 | 3/1964 | Canada | 285/321 |
| 2442393 | 7/1980 | France | 285/314 |
| 2028712 | 12/1971 | Germany | 285/321 |
| 1007203 | 10/1965 | United Kingdom | 285/314 |
| 180439 | 3/1966 | U.S.S.R. | 285/321 |
| 630483 | 10/1978 | U.S.S.R. | 285/321 |

Primary Examiner—Eric K. Nicholson
Attorney, Agent, or Firm—Peter A. Taucher; David L. Kuhn

[57] ABSTRACT

A device for quickly coupling and decoupling conduits comprises a fitting having spaced exterior surface concavities in an annular array and axially facing shoulders at the concavities, the fitting defining a bore open to one conduit. The device has a tube fixed to another conduit and sealed slidingly with the bore, and also has a receptacle translatable along the tube for rotatably receiving the fitting. The receptacle defines an opening where the receptacle enters, an orifice through which the tube passes and an annuler channel about the fitting. A spring axially mobile in the channel interferingly girds the fitting and has a first and second segments. The second segments protrude closer than the first segments to the device's central axis and fit the concavity. The device has a pin in the channel protruding radially inward further than a zone of the second segment but not as far as a zone of the first segment, whereby the pin is usable to selectively prevent spring rotation relative to the receptacle.

15 Claims, 2 Drawing Sheets

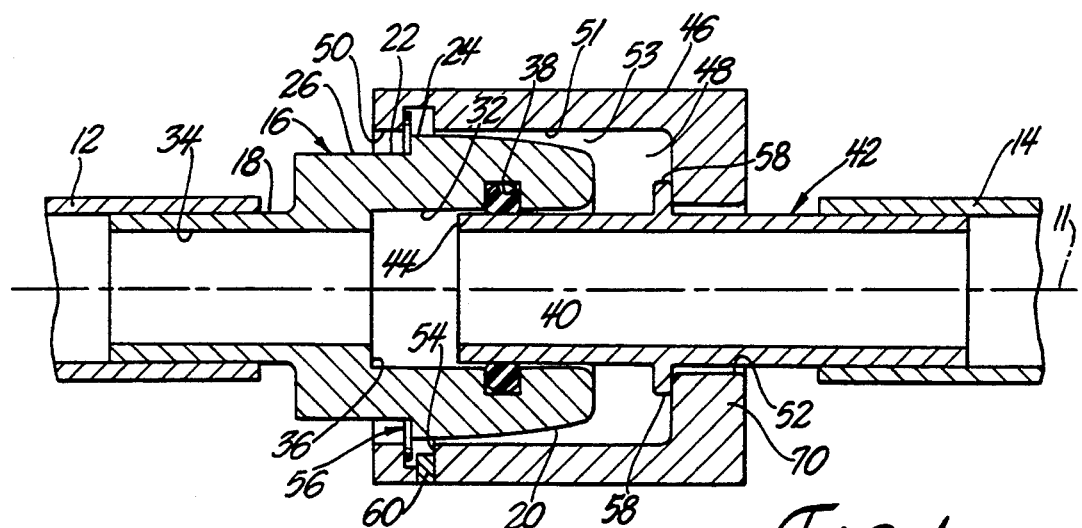
Fig. 1
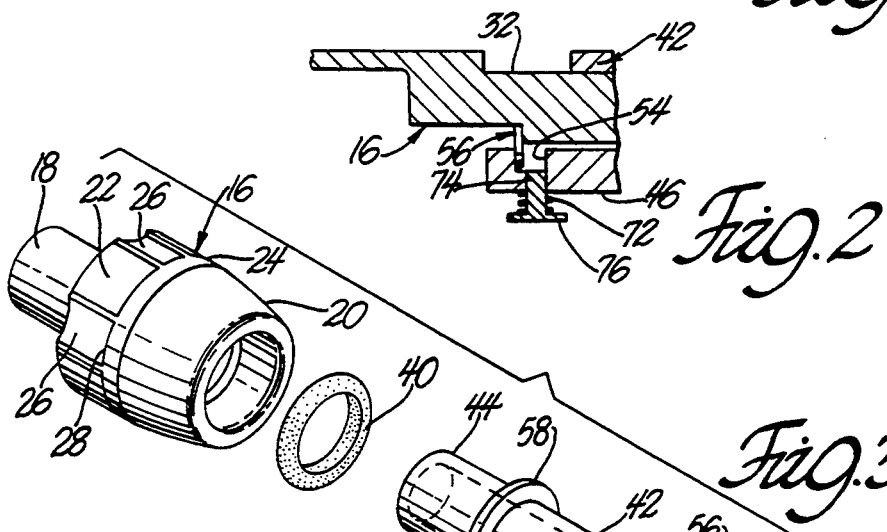
Fig. 2
Fig. 3
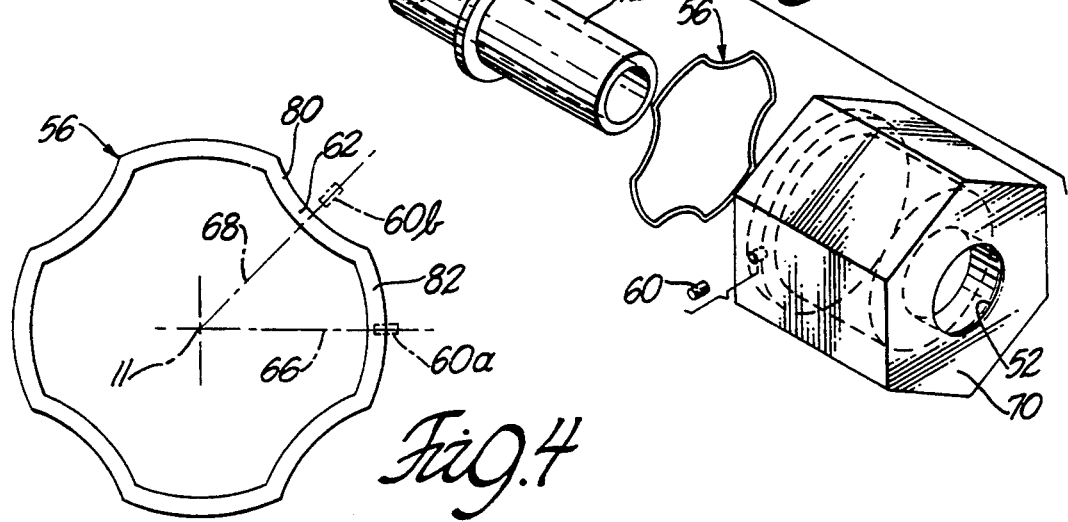
Fig. 4

5,447,342

HOSE COUPLING WITH SPRING CLIP HAVING INWARDLY AND OUTWARDLY CURVED SEGMENTS

GOVERNMENT USE

The invention described here may be made, used and licensed by or for the U.S. Government for governmental purposes without paying me royalty.

BACKGROUND AND SUMMARY

My invention relates to sealed couplings for hoses or other conduits that convey pressurized fluids. Particularly, my invention relates to quick-disconnect couplings useful at rugged, in-field sites, at military depots, on hose connections for military transport vehicles or on equipment where access to couplings with tools is difficult. Such couplings must maintain sealed connections despite vibrations, shocks, hose tension, extreme temperatures, ambient dust and contaminants. Preferably, the a coupling will be economic, be easy to use, and will require no tools for connection or disconnection.

My invention is a quick disconnect coupling that meets the above desires and needs. The coupling has a bored fitting whose spaced exterior concavities meet axially faced shoulders. The fitting's bore opens to a first hose and a second hose fixes to a tube slidingly sealed with the fitting's bore. A receptacle mobile on the tube accepts the fitting and has an interior channel surrounding the fitting. A spring axially mobile in the channel interferingly girds the fitting. The spring's inwardly arced segments protrude closer than other, alternated segments to the coupling's axis and fit the concavities. A pin in the channel protrudes radially inward more than zones of the alternated segments but less than zones of the inwardly arced segments. The spring's axial mobility relative to the pin lets the pin either stop spring rotation in the receptacle or allow this rotation, depending on the axial juxtaposition of the spring and pin.

BRIEF DESCRIPTION OF THE DRAWINGS

FIG. 1 is a sectional view of my coupling connecting two pressurized tubes.

FIG. 2 is a sectional detail view of an alternate pin arrangement for the FIG. 1 embodiment.

FIG. 3 is a perspective exploded view of my coupling.

FIG. 4 is a front elevational view of the spring used in my coupling.

DETAILED DESCRIPTION

Figure 5:
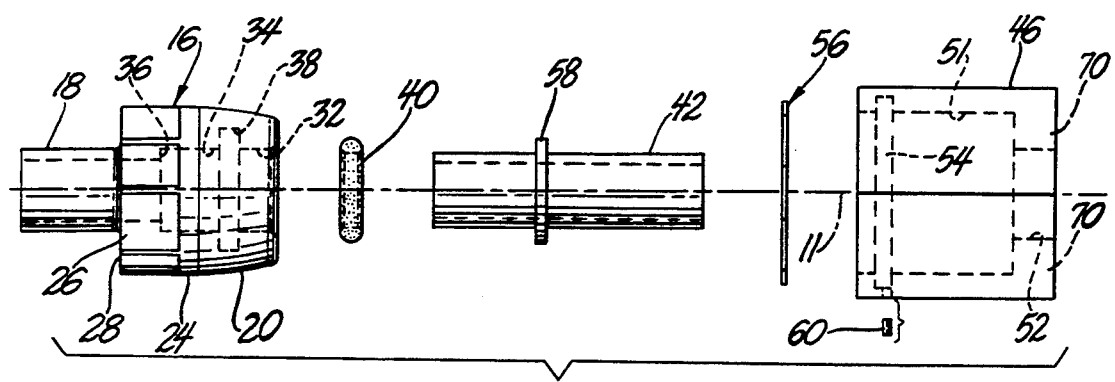
FIG. 5 is a side exploded view of my coupling.

FIG. 1 is a section view of my coupling 10 attached to respective ends 12 and 14 of hoses, pipes, tubes or like conduits, the ends and coupling being disposed along axis 11. Coupling 10 includes a fitting 16 whose stem 18 is tightly and sealingly received in hose end 12, stem 18 optionally affixed within hose end 12 by adhesive or clamps (not shown). At the opposite end of fitting 16 from stem 18 is frustoconical segment 20 whose exterior tapers away from stem 18. An intermediate segment integrally connects stem 12 with segment 20 and includes an axially narrow cylindrical band 24 adjacently between segment 20 and fluted axial zone 22. Zone 22 has somewhat channel-like, simply curved, shallow arcuate concavities or flutes 26 alternated with differently shaped surface areas such as simply curved, arcuate convexities 28 flush with band 24. Flutes 26 define with band 24 a set of axially facing shoulders 30 (FIG. 3) normal to axis 11.

Fitting 16 defines a stepped cylindrical through bore having a larger diameter section 32 and a smaller diameter section 34. Adjacently between sections 32 and 34 is an annular shoulder 36 facing axially away from stem 18, and within larger diameter section 34 is annular recess 38 accommodating a ring seal 40. Seal prevents fluid leakage between fitting 16 and tube 42 whose one end 44 fits closely in larger diameter section 32.

Still referring to FIG. 1, coupling 10 includes a polyhedral receptacle 46 defining therein a cylindrical chamber 48, which receives frustoconical segment 20 through a first axial opening 50. Typically, the inner peripheral wall 51 of receptacle 46 defines an annular gap 53 with frustoconical section 20 to avoid friction between receptacle 46 and fitting 16. For the same reason first axial opening 50 is typically slightly larger in diameter than any portion of fitting 16. A second, normally smaller, axial opening 52 of the receptacle accommodates tube 42. At the end of chamber 48 nearer opening 50, receptacle 46 defines an internal annular channel 54 coaxial with and open toward chamber 48. The channel has two parallel, opposed side walls adjacent and normal to a channel bed facing radially inward toward chamber 48.

Retained in channel 54 is a flat, radially symmetric spring 56 whose inner peripheral edge conformingly girds axial zone 22 of fitting 16 in FIG. 1. Typically, the outer peripheral edge of spring 56 defines a clearance with the bed of channel 54, so that friction between the outer peripheral edge and the channel bed does not inhibit rotation of spring 56 relative to either channel 54 or to receptacle 46. Preferably, spring 56 is the sole mechanism that retains fitting 16 in engagement with receptacle 46 and there is a slight gripping friction or interference between spring 56 and fitting 16. As best understood in conjunction with FIGS. 3 and 4, spring 56 is a closed, axially flat, radially narrow flexible metal ribbon or band comprised of inwardly arced segments 80 alternated with outwardly arced segments 82. Segments 80 conform to flutes 26 of fitting 16 and segments 82 conform to convexities 28 on the fitting. In the FIG. 1 juxtaposition of fitting 16 and spring 56, these elements are rotationally fixed relative to one another.

Referring now to FIGS. 1 and 3, coupling 10 includes tube 42 extending from within receptacle 46 into sealing connection with hose end 14. The connection between end 14 and tube 42 is optionally secured by a hose clamp, adhesive or lock ring, none of which are shown in the figures but all of which are known. Affixed to tube 42 is a radially extending collar member such as annular flange 58, which is disposed intermediate the tube's ends and which is within chamber 48 between opening 52 and fitting 16. The diameter of flange 58 exceeds those of axial opening 52 and section 32 of the fitting's bore. Consequently, flange 58 limits travel of tube 42 out of receptacle 46 through opening 52. Because of its limited translation, tube 42 is kept in engagement with receptacle 46 when the fitting's frustoconical segment 20 is held in the receptacle. Optionally, the region of tube 42 adjacent end 44 can be sized to interfere and seal with larger diameter section 32 of the fitting's bore.

Fixed to receptacle 46 and protruding into channel 54 is pin 60, which extends radially inward far enough to interfere with axial movement of the spring's segment 82 but not far enough to interfere with axial movement of middle 62 of segment 80. The function of pin 60 is to control or selectively prevent relative rotation between receptacle 46 and spring 56, as further discussed later. The radial positions of the pin relative to the spring's segments are illustrated in FIG. 4 where one relative pin position is depicted at 60a and another relative pin position is depicted at 60b. Pin positions 60a and 60b are equidistant from axis 11 along respective radial lines 66 and 68. It can be seen that a pin at position 60a will axially interfere with the spring's segment 82 whereas a pin at position 60b will not axially interfere with the spring's segment 80.

Note that the axial dimension or width of channel 54 exceeds the combined axial dimensions of pin 60 and spring 56, so that spring 56 in FIG. 1 rotates freely of pin 60. Pin 60 and receptacle 46 are axially mobile relative to spring 56 so that the pin and receptacle can be translated leftward in FIG. 1 until pin 60 radially aligns with middle 62 of (FIG. 4) spring segment 80. Pin 60 is preferably disposed adjacent the side wall of channel 54 further from axial opening 50.

In operation, fitting 16 and spring 56 first rotate from the FIG. 1 position until middle 62 radially opposes the part of channel 54 having pin 60. Then the fitting and spring slide axially until middle 62 radially aligns with pin 60. Fitting 16 again rotates, but pin 60 stops the spring's rotation by engaging one of segments 82. Fitting 16 thus now rotates relative to receptacle 46 but is angularly fixed relative to spring 56, which deforms as the fitting's convexities 28 engage arced segments 80. Once arced segments 80 sufficiently align with and are deformed by convexities 28, fitting 16 can be axially slid from receptacle 46 to disconnect hose ends 12 and 14. Reversal of the foregoing process achieves connection of hose ends 12 and 14.

Pressure within coupling 10 creates a locking effect that prevents removal of fitting 16 from receptacle 46, so that coupling 16 does not become accidentally disconnected when fluid therein is under pressure. The locking effect occurs when pressurized fluid exerts an axial force upon shoulder 36 within fitting 16, so that fitting 16 is biased outward from receptacle 46. As the fitting moves outward from the receptacle, spring 56 abuts the side wall of channel 54 nearer opening 50, and spring 56 is abutted by the shoulders 30 on fitting 16. Fitting 16, spring 56 and receptacle 46 then move axially together relative to tube 42 until the fitting's radial wall 70 contacts the tube's flange 58 as seen in FIG. 1. Spring 56 is now axially spaced from pin 60 and will rotate with fitting 16 so that the fitting's fluted zones 22 can not align with spring segments 80. Consequently, the fitting can not be extracted from receptacle 46 and coupling 10 is locked together.

FIG. 2 shows a minor modification that may be made to coupling 10 wherein pin 74 replaces pin 60, and coil spring 72 is connected between head 76 of pin 70 and the exterior of receptacle 46. Spring 72 biases pin 74 toward its FIG. 2 position where pin 74 will not interfere with axial motion of spring 56. Pin 74 can be pushed radially inward to interfere with spring 56 in the same way that pin 60 does. Positive actuation of pin 74 is required before coupling 10 can be connected or disconnected.

Figure 6:
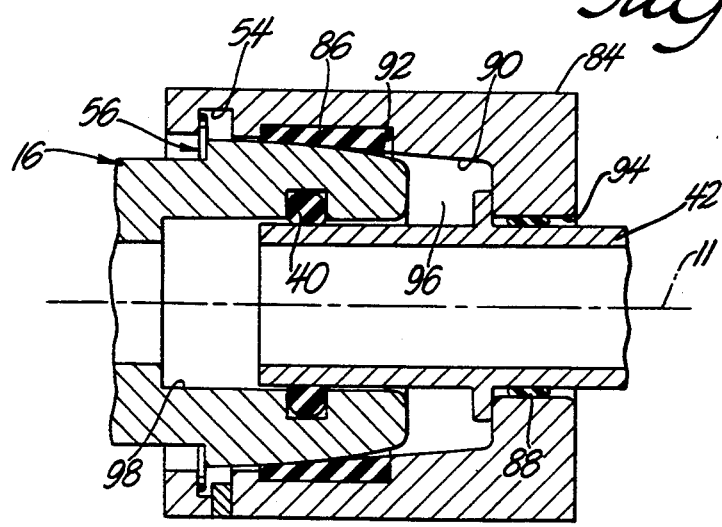
FIG. 6 is a partial sectional view of an alternate embodiment of my coupler.

Another modification that may be made to coupler 10 is shown in FIG. 6, where all elements are the same as in FIG. 1 except that receptacle 84 in FIG. 6 replaces receptacle 46 of FIG. 1. Receptacle 84 defines an axially tapering inner peripheral wall 90 having elastomeric seal band 86 flush therewith tapering in the axially opposite direction. A curvedly tapered outer diametrical surface 92 at the nose of fitting 16 elastically deforms band 86 and seals therewith. Affixed in axial opening 94 is annular seal 88 that prevents escape of fluid through opening 94. Band 86 and seal 88 cooperate to keep dust, dirt or other contaminants from attacking or harming seal 40. Additionally, seal 40 may be constructed so that a slight amount of pressure escapes from bore 98 into chamber 96 defined by receptacle 84, tube 42, fitting 16 seal 88 and band 86. Chamber 96 will thereby have positive fluid pressure relative to ambient air outside the coupling, so that entry of contaminants into the coupling is further deterred. Seal 40 can be similarly constructed in the FIG. 1 embodiment in a case where pressurized gas air flows through coupling 10, so that the flow of gas escaping receptacle 46 will deter contaminants from approaching seal 40.

I do not desire to be limited to the exact details of construction or method shown herein since obvious modifications will occur to those skilled in the relevant arts without departing from the spirit and scope of the following claims.

I claim:

1. A device for quick coupling and decoupling of conduits, comprising:
   a fitting connected to one of the conduits, the fitting defining a through bore and an exterior concavity;
   a tube connected to another of the conduits and sealingly engaged with the through bore;
   a receptacle translatable along the tube and rotatably receiving the fitting, the receptacle defining an entry opening where the fitting is received and an orifice through which the tube passes;
   means for limiting translation of the receptacle on the tube away from the other conduit;
   a spring retained in the receptacle, encircling the fitting and engaging the concavity;
   means axially mobile relative to the spring for selectively preventing relative rotation between the fitting and spring.

2. A device for coupling respective ends of two hoses, comprising:
   a fitting sealingly affixed to one of the hose ends;
   a concavity defined on the exterior of the fitting;
   a bore defined through the fitting;
   a tube sealingly affixed to the other of the hose ends and slidingly sealed with the bore;
   a receptacle receiving the fitting and defining an aperture through which translates the tube;
   a member extending radially from the tube further than the aperture;
   an axially flat spring retained in the receptacle and girding the fitting;
   a first segment of the spring;
   a second segment of the spring reaching further radially inward than the first segment and closely fit to the concavity;
   a shoulder of the fitting adjacent the concavity, facing the spring and faced away from the aperture;
   means for controlling relative rotation between the fitting and the spring by selectively preventing relative motion between the second segment and the concavity.

3. A device for quick coupling and decoupling of fluid conduits, comprising:
   a longitudinal axis of the device;
   a fitting sealingly fixed to one of the conduits, the fitting defining a through bore and an exterior concavity;
   an axially facing shoulder adjacent the concavity;
   a tube sealingly fixed to another of the conduits, the tube being in sealed sliding engagement with the fitting;
   a receptacle axially translatable along the tube and rotatably receiving a portion of the fitting, the receptacle defining an opening where the portion is received and an orifice through which the tube passes and an annuler channel about the fitting, the channel having axially opposed side walls;
   a spring in the channel and axially mobile thereacross and interferingly girding the fitting, the spring having a first segment and a second segment, the second segment protruding closer to the axis than the first segment and fit with the concavity;
   means for selectively preventing relative rotation between the fitting and the spring, the preventing means including a pin protruding radially inward into the channel further than a zone of the second segment but not as far as a zone of the first segment.

4. The device of claim 1 further comprising:
   a longitudinal axis of the device;
   a plurality of the concavities disposed about the axis;
   a plurality of surface areas on the fitting shaped differently from the concavities and alternated with the concavities;
   radially inwardly curved segments of the spring engaging the concavities;
   other segments of the spring connecting the curved segments of the spring and frictionally fit with the surface areas of the fitting.

5. The device of claim 4 wherein the curved segments of the spring and the other segments of the spring together form a closed, axially flat, twistable band.

6. The device of claim 1 further comprising:
   a longitudinal axis of the device;
   an axially facing shoulder adjacent the concavity;
   the fitting defining an internal annular channel centered on the axis;
   wherein the spring is retained by the channel, faces the shoulder and is disposed at a position along the axis between the shoulder and the entry opening.

7. The device of claim 6 wherein the limiting means comprises a member inside the receptacle and fixed to the tube, the member extending radially further from the axis than a periphery of the orifice.

8. The device of claim 7 wherein the preventing means is a pin adjacent one side wall of the channel, the pin extended closer to the axis than one zone of the spring but disposed further from the axis than another zone of the spring.

9. The device of claim 8 including means for moving the shoulder and spring away from the one side wall when the conduits are pressurized, the moving means including a step in the bore.

10. The device of claim 2 further comprising:
    a longitudinal axis of the device;
    a plurality of the concavities;
    a plurality of convexities on the fitting alternated with the concavities to form an array centered on the axis;
    first curved segments of the spring inwardly arced relative to the axis and fit with the concavities;
    second curved segments alternated with the first curved segments and connecting the first segments, the second curved segments outwardly arced relative to the fitting and fit with the convexities.

11. The device of claim 10 wherein the first and second curved segments of the spring together form a closed, axially flat, radially narrow band.

12. The device of claim 10 wherein the receptacle has radial clearance with the fitting.

13. The device of claim 3 further comprising an annular flange fixed about the tube, disposed within the receptacle and having a diameter larger than the orifice.

14. The device of claim 3 wherein the spring is an axially flat, radially narrow, flexible closed band frictionally and conformingly engaged to the fitting.

15. The device of claim 14 wherein the spring has radial clearance with a bed of the channel.

* * * * *